United States Patent
Dakss et al.

(10) Patent No.: US 9,913,001 B2
(45) Date of Patent: Mar. 6, 2018

(54) SYSTEM AND METHOD FOR GENERATING SEGMENTED CONTENT BASED ON RELATED DATA RANKING

(71) Applicant: NBCUniversal Media, LLC, New York, NY (US)

(72) Inventors: Jon Dakss, Englewood Cliffs, NJ (US); Fielding Kidd, Englewood Cliffs, NJ (US); Michael Ibrahim, Englewood Cliffs, NJ (US)

(73) Assignee: NBCUniversal Media, LLC, New York, NY (US)

( * ) Notice: Subject to any disclaimer, the term of this patent is extended or adjusted under 35 U.S.C. 154(b) by 77 days.

(21) Appl. No.: 14/986,077

(22) Filed: Dec. 31, 2015

(65) Prior Publication Data
US 2017/0195753 A1 Jul. 6, 2017

(51) Int. Cl.
*H04N 21/845* (2011.01)
*G11B 27/34* (2006.01)
*H04N 21/482* (2011.01)
*H04N 21/472* (2011.01)

(52) U.S. Cl.
CPC ......... *H04N 21/8456* (2013.01); *G11B 27/34* (2013.01); *H04N 21/4828* (2013.01); *H04N 21/8455* (2013.01); *H04N 21/47217* (2013.01)

(58) Field of Classification Search
CPC .............. H04N 21/4755; H04N 5/44543
See application file for complete search history.

(56) References Cited

U.S. PATENT DOCUMENTS

| | | | |
|---|---|---|---|
| 8,528,019 B1* | 9/2013 | Dimitrova | G06F 17/30787 382/111 |
| 8,966,514 B2* | 2/2015 | Tsurumi | H04N 21/251 725/12 |
| 2016/0117332 A1* | 4/2016 | Oztaskent | H04N 21/4782 707/725 |

* cited by examiner

*Primary Examiner* — Olugbenga Idowu
(74) *Attorney, Agent, or Firm* — Lee, Hong, Degerman, Kang & Waimey PC

(57) ABSTRACT

Systems and methods for generating segmented content based on related ranking information are disclosed. Some embodiments include indexing audio information of primary content based on a first plurality of time segments, where the indexed audio information includes a plurality of audio identifiers; indexing video information of the primary content based on a second plurality of time segments, where the indexed video information includes a plurality of video identifiers, obtaining secondary data related to the primary content from an external source, generating identifying information corresponding to the secondary data and comparing the generated identifying information with the indexed audio information and video information, increasing a rank value associated with a segment of the primary content, and generating a media file corresponding to a segment associated with a highest rank value and storing the generated media file in a memory.

14 Claims, 6 Drawing Sheets

SYSTEM AND METHOD FOR GENERATING SEGMENTED CONTENT BASED ON RELATED DATA RANKING

RELATED DATA RANKING

With the increasing number of available channels for consuming content including television, movies, downloadable media, social media, streaming online video services, and the like, short form content has become an extremely popular avenue for reaching as many audience members as possible. Especially with the massive amounts of information and content available to users with the proliferation of mobile devices such as smartphones, tablets, and smart devices including wearable technology, it may be more effective to present information in the form of short form content in order to effectively communicate to users who have become accustomed to consuming content in smaller segments. This is evident in the popularity of services such as social networks limiting the number of words within a single communication, blog and article services providing brief summaries of longer form content, or video sharing services limiting the length of videos users are able to upload.

In view of the shift to consumption of shorter form content, some content providers face the difficulty of presenting users with content corresponding to more traditional long form material that is easily digested and appeal to the attention of today's user. Additionally, users consume content on various platforms while also generating data related to the content on other platforms which may be beneficial to the content provider. For example, users may consume content corresponding to a television show on an online streaming video platform accessed on a laptop computer and generate social media data related to the same television show on a social networking service using their mobile phone. It may be greatly beneficial for content providers to be able to utilize all data related to the content in order to most effectively present the most appealing content to users.

Current computer hardware and/or software systems used for generating short form content are inefficient and fail to provide the ability to provide content providers with the ability to utilize related data from various data sources in determining the most effective and appealing short form content for presentation to users. Thus, it may be advantageous for a system and method to improve existing systems for generating segmented content based on related data ranking derived from various data sources.

SUMMARY

Embodiments of the present disclosure include a system and method for generating segmented content based on related data ranking. The related data ranking may be based on information received from external sources regarding the segmented content, wherein the content is segmented using primary long form content. The segmented content may be a portion of the long form content which is segmented to generate short form content media which is determined to have a highest or high level ranking. The ranking information may include activity from users of other external services with respect to video, audio, text, images, or other media which is associated with the primary long form content. The generated segmented content may be used to store in a memory, transfer to another party or location, display to one or more users, or present for consumption by users. The segment of the content may also be identified, displayed or otherwise presented to a user to allow for segmenting of another portion of the primary long form content based on the ranking information associated with the segment.

An embodiment of a method of the present disclosure includes indexing audio information of primary content based on a first plurality of time segments, wherein the indexed audio information comprises a plurality of audio identifiers, indexing video information of the primary content based on a second plurality of time segments, wherein the indexed video information comprises a plurality of video identifiers, obtaining secondary data related to the primary content from at least one external source, generating identifying information corresponding to the obtained secondary data and comparing the generated identifying information with the indexed audio information and indexed video information, increasing a rank value associated with a segment of the primary content when the generated identifying information matches at least a portion of the indexed audio information or a portion of the indexed video information corresponding to the segment, and generating a media file corresponding to a segment associated with a highest rank value and storing the generated media file in a memory.

A system according to an embodiment of the present disclosure may include a memory configured to store information, a communication unit configured to transmit and receive information, and one or more processors configured to: index audio information of primary content based on a first plurality of time segments, wherein the indexed audio information comprises a plurality of audio identifiers, index video information of the primary content based on a second plurality of time segments, wherein the indexed video information comprises a plurality of video identifiers, obtain secondary data related to the primary content from at least one external source via the communication unit, generate identifying information corresponding to the obtained secondary data and comparing the generated identifying information with the indexed audio information and indexed video information, increase a rank value associated with a segment of the primary content when the generated identifying information matches at least a portion of the indexed audio information or a portion of the indexed video information corresponding to the segment, and generate a media file corresponding to a segment associated with a highest rank value and causing the memory to store the generated media file in a memory.

BRIEF DESCRIPTION OF THE DRAWINGS

The above and other aspects and features of the present disclosure will become more apparent upon consideration of the following description of embodiments, taken in conjunction with the accompanying drawing figures.

DETAILED DESCRIPTION

In the following detailed description, reference is made to the accompanying drawing figures which form a part hereof, and which show by way of illustration specific embodiments of the present invention. It is to be understood by those of ordinary skill in this technological field that other embodiments may be utilized, and that structural, electrical, as well as procedural changes may be made without departing from the scope of the present invention. Wherever possible, the same reference numbers will be used throughout the drawings to refer to the same or similar parts.

Embodiments of the present invention relate to a system and method for generating segmented content based on related data rankings. In this disclosure, the content will be discussed primarily with respect to video content, however, various applications of the systems and methods disclosed herein to other media are contemplated, including, but not limited to television, radio, digital video recorder media, internet radio, internet video, other forms of streaming content, virtual reality content, and the like.

Figure 1:
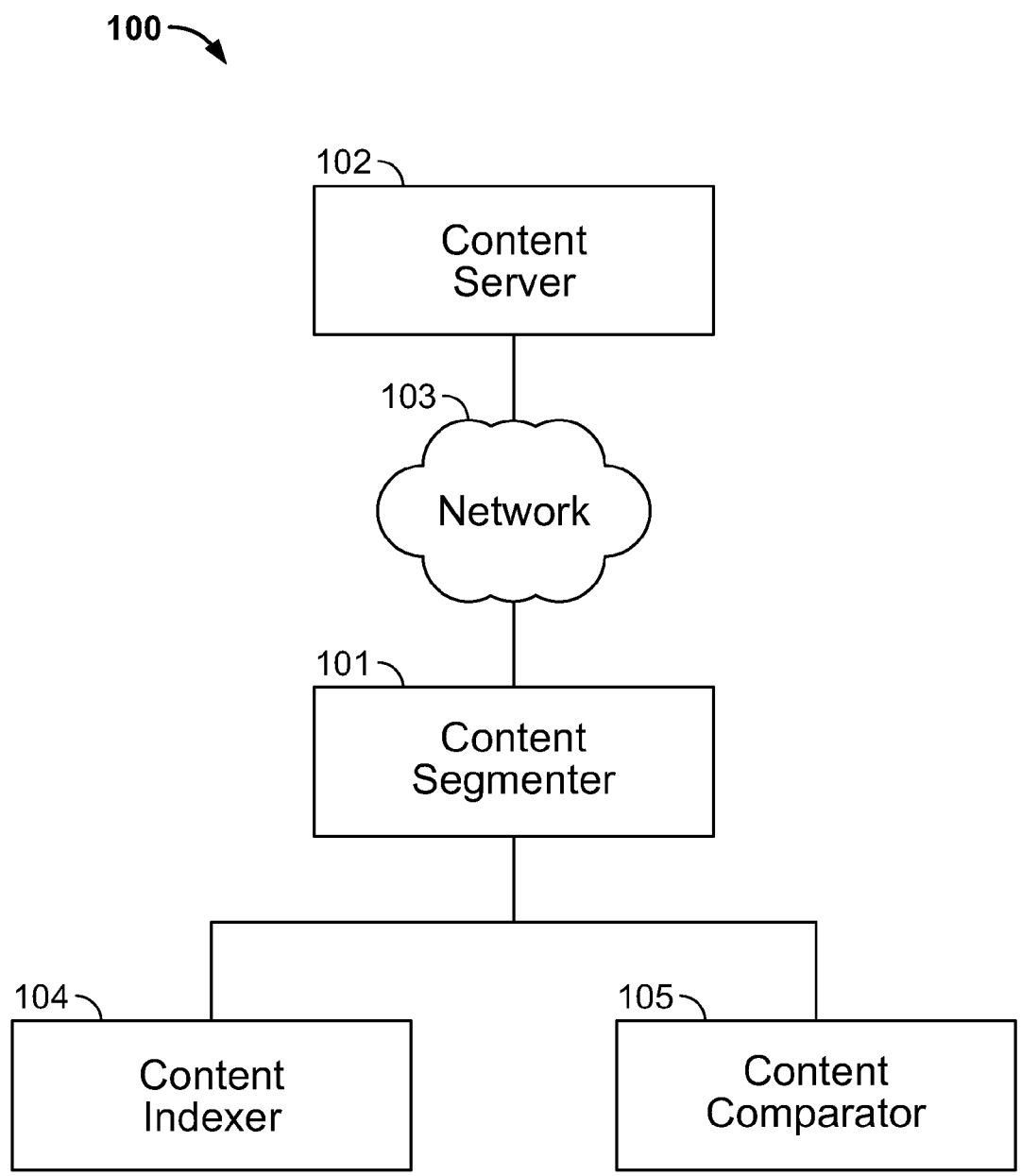
FIG. 1 is an illustration of a system for generating segmented content based on related ranking information in accordance with an embodiment of the present disclosure.

Referring to FIG. 1, an embodiment of a system 100 for generating segmented content based on related data rankings is shown. The system may include a content segmenter 101, connected to a content server 102 via a network 103. The content segmenter 101 may be implemented as computer hardware including one or more processors connected to a content indexer 104 and a content comparator 105. In some embodiments, the content segmenter 101 may include the indexer 104 and the comparator 105, and in other embodiments the content segmenter 101 may be operably coupled to the indexer 104 and the comparator 105, which separately may be implemented as computer hardware, including one or more processors. The content indexer 101 may be configured to receive primary content from the content server to analyze, identify, and index portions of the primary content.

The network 103 may include various systems for distribution of content or other data including any desired combination of hardwired and wireless communication links, including wide area networks (WAN), local area networks (LAN), wireless networks suitable for packet-type communications, over-the-air, cable, internet, other network connection systems, and the like, which implement networks and hardware known and used in the related art, including broadcast technologies, cable or satellite distribution systems, internet protocol (IP), or other networked technologies, and the like, wherein examples of the content include live and recorded television, movies, internet streaming video and audio, music, radio or other audio-visual content, and the like.

The primary content provided by the content server may correspond to an item of long form content, such as a movie. The content may be stored by the content server in a memory as digital files of the primary content, or the content server may store information related to where the primary content may be retrieved from, such as an external server. Said information and content may be stored in a relational database system, or other data storage and management system. The primary content may be provided by the content server 102 in response to an input received at the content segmenter 101. For example, the content segmenter 101 may transmit to the content server 102 a specific request for a particular item of primary content, where the specific request includes a title, a genre, an actor, a topic, or the like including other metadata related to the primary content. In response to the specific request, the content server 102 may identify a particular item of primary content to provide to the content segmenter 101 via the network 103.

In some embodiments, the content segmenter 101 may include, or otherwise be operably coupled to inputs, for example input hardware such as keyboards or a computer mouse, for input of information to the content segmenter 101. In some embodiments, a user may enter, via the inputs, information related to the primary content, such as the title, for identifying and retrieving the primary content from the content server 102. In other embodiments, the system may be configured to retrieve and segment various primary content from the content server automatically, such as content which has been recently added to the content server, or content which satisfies one or more particular search criteria.

In some embodiments, the content segmenter 101 will provide the received primary content information to the indexer 104 which is configured to analyze and index various information of the primary content. For example, the indexer may be configured to analyze the primary content and generate video and audio fingerprints identifying various portions of the primary content.

In one example, the indexer 104 may be configured to analyze the video information of the primary content and generate an identifying video fingerprint for every grouping of video frames of the primary content, where each grouping includes 24 frames. For primary content which is stored in a format having 24 frames per second, each video frame grouping may correspond to one second of video. Therefore, the indexer 104 analyzes the primary content and generates and indexes identifying video fingerprints for every second of the primary content video.

The indexer 104 may utilize methods and systems for generating and indexing identifying video fingerprints generally known and used in the art. For example, to generate a fingerprint identifying a grouping of 24 frames making up one second of the primary video content, the indexer 104 may convert the grouping of 24 consecutive frames into RGB macroblock vectors, which represent average RGB values of each frame. In some embodiments, the RGB macroblock vectors may be generated for the entire frame, or alternatively the RGB macroblock vectors may be generated for a selected portion of each frame to generate the fingerprint values.

The macroblock vectors may be stored in a database to be associated with the primary content and the corresponding time point of the grouping of video frames. The database may be stored in a memory included in the indexer 104, or alternately the indexer 104 may store the generated fingerprint information in a database stored in a memory operably coupled to the indexer 104 or stored a memory via the network. The indexer may be configured to analyze and generate identifying fingerprint values for all frames of the primary content at various levels of grouping such that any portion of the primary content may be identified based on the generated fingerprints. All generated fingerprints may be stored and indexed to be associated with the primary content.

Similarly, the indexer 104 may be configured to analyze and generate identifying fingerprint information for the audio information of the primary content. The indexer 104 may utilize the full audio of the primary content to generate identifying acoustic fingerprints based on particular time intervals of the audio of the primary content, such as 5 second or 10 second intervals. The indexer 104 may utilize acoustic analyzing and fingerprinting systems and methods known to those of ordinary skill in the art, such as by generating hash tokens corresponding to identifying a range of frequencies having a minimum magnitude.

In other embodiments, the indexer 104 may generate identifying fingerprints for the intervals of the audio of the primary content based on the spoken dialogue of the primary content to identify and index the speech of the characters within the primary content. In one embodiment, the indexer 104 may utilize speech-to-text systems and methods well known to those of ordinary skill in the art to analyze audio data and identify the corresponding text of the speech. This may also be accomplished in some embodiments by using captioning or subtitle information associated with the primary content which may be provided by the content server. The indexer may analyze the dialogue or captioning data to obtain text information associated with the particular interval of the primary content audio and store and index the obtained text information to be associated with the primary content and the corresponding time interval. The generated fingerprint information may be associated with representative data according to various methods and systems of data indexing and searching known in the art, for example the generated fingerprint information may correspond to a hash token representing the obtained text information for searching and identification.

Similar to the video indexing, the audio fingerprints may be stored in a database to be associated with the primary content and the corresponding time point of the primary content intervals. The database may be stored in a memory included in the indexer 104, or alternately the indexer 104 may store the generated fingerprint information in a database stored in a memory operably coupled to the indexer 104 or stored a memory via the network. The indexer may be configured to analyze and generate identifying fingerprint values for the entire duration of the primary content audio such that any portion of the primary content may be identified based on the generated fingerprints. All generated fingerprints may be stored and indexed to be associated with the primary content.

Thus, the indexer 104 of the system may be configured to analyze the primary content and generate a potentially significant number of identifying fingerprints corresponding to the video and the audio and/or speech of the primary content. The fingerprints may be generated for varying intervals or groupings of frames of the primary content such that the content may be identified even at small segments or levels of granularity.

The content segmenter 101 may include a database stored in a memory coupled to a corresponding server computer (not depicted) which stores, manages, searches, and provides information related to the primary content fingerprint information. The fingerprint information may be stored to be associated with the primary content as well as various metadata related to the primary content.

The content comparator 105 of the content segmenter 101 may be configured to obtain content fingerprint information, such as the identifying video and audio fingerprint information discussed above, and search the database of stored fingerprint information to identify a match. The comparator 105 may identify the primary content corresponding to the obtained content fingerprint information, despite the obtained content fingerprint information corresponding to a small portion of the primary content. Configurations and embodiments of the content segmenter 105 will be discussed further below.

Figure 2:
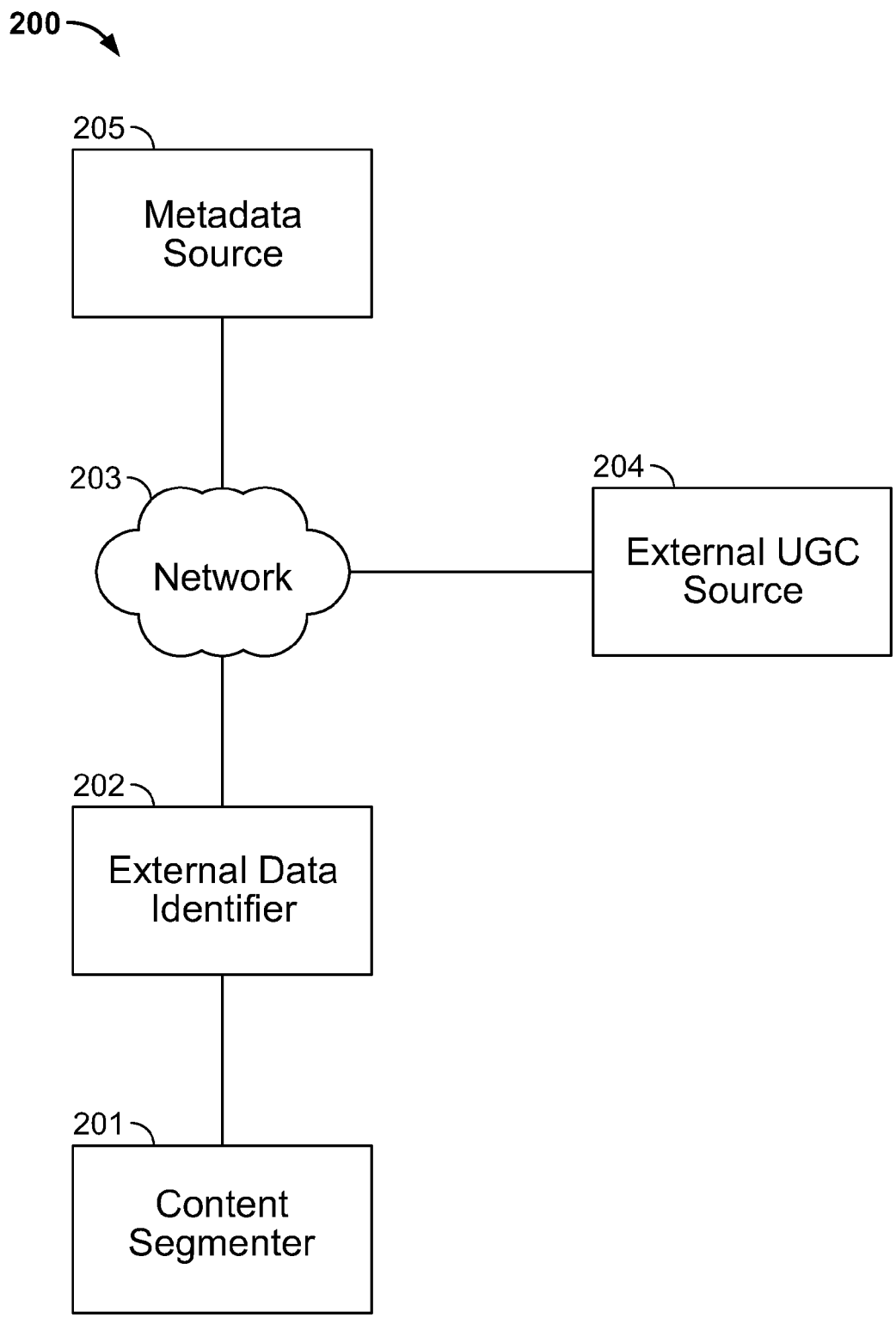
FIG. 2 is an illustration of another embodiment of a system for generating segmented content based on related ranking information.

Referring now to FIG. 2, other aspects of embodiments of the system 200 discussed above is depicted. The system 200 includes the content segmenter 201 connected to the network 203 as discussed above, and the segmenter may be configured to include the indexer and the comparator, not depicted in FIG. 2. Embodiments of the system 200 may include an external data identifier 202 configured to search, detect, identity, and retrieve external secondary content via the network 203. The external data identifier 202 may be implemented as computer hardware, including one or more processors.

External secondary content may be related to primary content, and in some cases may be secondary content including portions of the primary content. The external secondary content may correspond to external user generated content (UGC) 204 in the form of blogs, wikis, discussion forum posts, chats, tweets, podcasts, bookmark pins, digital images, video, audio files, and other forms of media that are created by users of an online system or service, often made available via social media websites such as FACEBOOK, TWITTER, INSTAGRAM, YOUTUBE, VIMEO, IMGUR, PINTEREST, REDDIT, and the like. The external data identifier 202 may be configured to search for and retrieve external UGC data from the external UGC source 204 via the network 203. The external data identifier 202 may retrieve external UGC data and provide the data to the content segmenter 201 for use in generating segmented data.

In some embodiments, the external data identifier 202 may be configured to search for information maintained at the external UGC source 204 and communicate with the external UGC source 204 via source-specific application programming interfaces (API) provided by an online system or service, such as a social media website. The external data identifier 202 may be implemented with the content segmenter 201, or alternatively the external data identifier 202 may be separately implemented. While FIG. 2 depicts the external data identifier 202 in direct communication with content segmenter 201, the external data identifier 202 may be separate and implemented to communicate with external UGC source 204 and content segmenter 201 via network 203, or other communication systems such as those previously discussed.

In some embodiments, the external data identifier 202 may be provided with inputs regarding the primary content to search and retrieve from the external UGC source 204. For example, the inputs received by the content segmenter inputs, such as a title of a movie, may be provided to the external data identifier to search for UGC related to the title of the movie. As a result of the search, the external data identifier 202 may retrieve a FACEBOOK comment by users quoting a particular portion of dialogue from the movie, a YOUTUBE video clip posted by a user as a preview or review of the movie, an IMGUR post including an image of a frame form the movie, and the like. Various other forms of external secondary content may be retrieved and are considered in this disclosure such as blog posts, forum discussion posts, data regarding social media "likes" or "shares", and the like, referred to herein as secondary notation data.

In other embodiments, the external data identifier 202 may be provided with a combination of metadata related to the primary content, such as the genre, actors, related descriptors, production companies, and the like. Based on the provided metadata information, the external data identifier 202 may search external secondary content sources for secondary content such as UGC related to the metadata information. Based on the search, the external data identifier 202 may retrieve the UGC data that is determined to be related to the metadata and/or the primary content. The retrieval may include downloading the external secondary content such as the video file or the audio file, along with the secondary notation data associated with the secondary content.

In some embodiments, the external data identifier 202 may be configured to obtain metadata to be used for searching for secondary content from an external source. For example, the external data identifier 202 may be configured to communicate with an external metadata source 205, such as IMDB, WIKIPEDIA, or the like, for metadata information related to primary content. Where the primary content corresponds to a movie having a title such as "Jurassic Park," the external data identifier 202 may be configured to query the external metadata source 205 for additional metadata related to the movie title name.

In response to the query, the external data identifier 202 may receive metadata, in some cases in defined metadata name value pairs, including the year of release ("year: 1993"), actors appearing in the movie ("actor: Jeff Goldblum"), name of the director ("director: Steven Spielberg"), and the like. These examples are not limiting as they are provided for discussion purposes only and those of ordinary skill in the art will recognize that various known metadata formats and values may be implemented and are considered by this disclosure.

The external data identifier 202 may be configured to store the received metadata information in a database maintained at a server computer, where the database may be maintained at the external data identifier 202, at the content segmenter 201, or another memory storing a database operably connected to the external data identifier via the network 203, or other connection as previously discussed. Using the received metadata information, the external data identifier 202 may search the external UGC source 204 for secondary content related to the metadata values.

For example, the external UGC source 204 may be searched for any secondary content related to the movie title "Jurassic Park," or any content including the actor "Jeff Goldblum," or any content directed by "Steven Spielberg." In some embodiments, the external data identifier 202 may be configured to use combinations of search queries to narrow the search results to those likely to be directly related to the primary content. As an example, a search query for only the year "1993" provided by the metadata would likely return an excessive number of secondary content results. Instead, a combination search query including the year "1993" and the actor "Jeff Goldblum" would return a more focused list of search results which are likely to be related or relevant to the primary content associated with the metadata information.

In yet other embodiments, the external data identifier 202 may not search for any particular title or metadata of the primary content, and may simply retrieve the UGC or other secondary content with the highest frequency of occurrence (e.g., most popular) or most recently generated. The external data identifier 202 may be configured to utilize "crawler" techniques to continuously search the external data sources for UGC or other secondary content information. It will be understood by one or ordinary skill in the art that configurations are also considered where the external data identifier 202 is configured with a combination of any of the above discussed embodiments.

Once retrieved, the external data identifier 202 may provide the retrieved external UGC data to the content segmenter 201. The content segmenter 201 may then analyze and generate identifying fingerprint information for the UGC data, including video fingerprint information, audio fingerprint information, and text fingerprint information, similar to generating fingerprint information for the primary data as discussed above.

For example, where the external data identifier 202 searches external data sources for a title of a movie, it may identify and retrieve a video uploaded by a user on YOUTUBE of a clip from the movie. Using the movie clip, the content segmenter 201 may generate video fingerprint information based on groupings of frames of the movie clip, for example generating an identifying video fingerprint for every second of the video clip. Alternately, the content segmenter 201 may generate audio fingerprint information based on particular time intervals or dialogue of the movie clip as previously discussed. The content segmenter 201 may further be configured to analyze and generate identifying fingerprint information for the retrieved external secondary content similar to the fingerprints discussed above with respect to the primary content, including video fingerprint, audio fingerprint, text fingerprint, image fingerprint, and the like.

The identifying fingerprint information of the movie clip may then be stored in a database in a memory included in the content segmenter 201, or otherwise operably coupled thereto, including an index database connected via the network 203.

The content comparator 105, depicted in FIG. 1, may use the generated secondary content fingerprint information to search for matching identifying fingerprint information in a database included in, or otherwise operably connected to, the content segmenter 201. Where the secondary content includes multiple fingerprint information including video and audio (such as where the secondary content corresponds to a movie clip), the content comparator 105 may identify a match with stored primary content based on a single fingerprint match, such as one of video, audio, image, or text fingerprint, or in other embodiments the content comparator 105 may be configured to require at least two, three, or more matches of identifying fingerprint information before determining a direct match with stored primary content fingerprint information, such as requiring both the video fingerprint and the audio fingerprint (when available) to match before the match determination.

In some embodiments, the match with identifying information of primary content may be based on a string of matched identifiers, for example where each identifier corresponds to a single second of content. Thus, the content comparator may begin by matching a first identifier corresponding to the first second. Once a match is determined, the content comparator 105 may compare the next consecutive fingerprint identifier of the secondary content with the next consecutive fingerprint identifier of the primary content. If a match on the second consecutive identifier is determined, the content comparator 105 may compare the third, followed by the forth, and so on.

Once the content comparator 105 reaches either the end of the secondary content, or reaches a point where an identifier of the primary content and an identifier of the secondary content which do not match, the content comparator 105 may determine that it is the end of the matched clip and generate information related to the time interval of the primary content for which a match has been identified.

For example, in the case of a video fingerprint of a UGC video clip, the indexer may generate an average macroblock vector for every second of the duration of the clip, with the vector representing an average RGB value over the duration of 24 frames included in the single second of video. As discussed, a database of the content segmenter may store fingerprint information of primary content, where macroblock vectors are stored for each second representing the entire duration of the primary content.

The content comparator may compare the identifying information of the secondary content to the stored identifying information of all processed primary content. During comparison with identifying information of a particular primary content, the content comparator may determine that second zero (0) of the secondary content corresponds to the first second of the $45^{th}$ minute of the primary content when a match of the macroblock vectors is detected. Starting from the first second of the $45^{th}$ minute of the primary content, the comparator may continue comparing the next successive vector until no match is found at the $36^{th}$ second of the $45^{th}$ minute of the primary content. In other cases, the end of the secondary content may be reached instead of discovering that no match is found.

In the above example, the content comparator 105 may identify that the secondary content (UGC video clip) retrieved from the external UGC source is a video clip corresponding to the first 35 seconds of the $45^{th}$ minute of a particular primary content movie. When such a match with primary content is identified, the content segmenter 201 may obtain information related to the primary content, the matched identifiers, secondary notation data, and the corresponding time within the primary content which corresponds to the matched secondary content. The content segmenter may store information in a database related to the matched secondary content, including information regarding the secondary content and source of the content, the portion of the matched primary content, secondary notation data, corresponding metadata, and the like.

In some embodiments, the content segmenter 201 may be configured to store and manage a counter for each matched interval or portion of the primary content to keep track of how many times a particular interval or portion has been matched to secondary content. For example, each grouping of frames of the video of the primary content (each 24 frames—or any other number of frames based on the recorded frame rate—corresponding to one second in the above example), may be associated with a counter which indicates how many times secondary content was matched to that particular portion of the content. Therefore, in the above example, the counters corresponding to the first 35 seconds of the $45^{th}$ minute of the primary content would be incremented by one to indicate that the secondary content has been matched. If another form of UGC is matched to a portion of the same interval, only those portions that are matched will be incremented.

In various embodiments, the counter may be associated with frames of the primary content or specific time intervals of the primary content, or in other cases the counters may be based on content within the primary content, such as a counter associated with a specific spoken dialogue portion. Here, counters are discussed with respect to seconds, frames, or frame groupings of the primary content, but it will be understood by those of ordinary skill in the art that counters may be associated with various intervals or portions of the primary content.

Further in the example, if the comparator 105 next identifies a social media post which includes a quote from the primary content, where the quote is spoken by a character during the $43^{rd}$ minute to the $45^{th}$ minute which ends at the $25^{th}$ second of the 45 minute, the counters corresponding to the matched portions are incremented to indicate that a match has been identified. After matching the video clip at the first 35 seconds of the $45^{th}$ minute and the quote text ranging from the $43^{rd}$ minute to the $45^{th}$ minute, the counters corresponding to the first 25 seconds of the $45^{th}$ minute are incremented twice, while all other counters are only incremented once. Accordingly, a value of the counter corresponding to a particular portion of the primary content may indicate how popular the particular portion is as UGC and social media content.

In another example, the external data identifier 202 may obtain secondary content corresponding to an image or snapshot from a movie that was posted to the image sharing website service IMGUR as a result of a metadata search. After identifying information of the image is generated and indexed by the indexer 104, the comparator 105 may determine that the movie image corresponds to the $18^{th}$ frame of the $35^{th}$ second of the $121^{st}$ minute of the primary content movie. Accordingly, the counter for the particular frame may be incremented, or in other embodiments the counter for the particular second, minute, scene, or other interval or portion of the primary content may be incremented to indicate the popularity of the particular interval or portion.

Further, the counter may not be limited to tracking only the number of times a particular portion of the primary content is viewed, shared, liked, or the like. In some embodiments, the secondary notation data may be analyzed to increment the counter proportionally with the amount of social activity surrounding the associated external secondary content. As an example, where the external secondary content corresponds to a movie clip posted by a user on FACEBOOK, the corresponding secondary notation data may include information regarding 300 "likes" that the FACEBOOK post received by other users connected to the originating user. The content segmenter 201 may be configured to give this more weight when incrementing the counter for the portions of the primary content corresponding to the movie clip, as compared to another FACEBOOK post of another movie clip which only received 25 "likes" from users connected to the originating user.

In another example, the particular type of secondary notation data may also be considered, in addition to merely the amount of secondary notation data. For example, the content segmenter 201 may be configured to give more weight to secondary notation data with higher "social velocity", which contributes to the social activity surrounding the particular item of secondary content. For example, the content segmenter 201 may be configured to consider the social velocity difference between a movie clip (secondary content) posted on FACEBOOK receiving 50 "views", and a movie clip posted to TWITTER receiving 50 "re-tweets". As a "view" may be considered as a passive form of social activity which may not raise awareness or increase social velocity of the particular secondary content among other users, the weight of the secondary notation data maybe adjusted accordingly.

By comparison, the content segmenter 201 may be configured to adjust the weight of social activity such as "re-tweets" differently as this may be seen as more of an active social activity which increases awareness of the content in other users, thereby increasing the general social velocity of the secondary content. Accordingly, the increase in the counter may be accordingly adjusted based on the amount, effect, and type of the retrieved secondary notation data associated with the secondary content. The handling of secondary notation data is not limited to the above examples and those of ordinary skill in the art will recognize that this disclosure considers various types and sources of the secondary content and notation data, including but not limited to views, tweets, comments, likes, tags, messages, posts, favorites, pins, and the like.

Additionally, the retrieved secondary notation data may also include demographic information regarding the particular user that originated the secondary content, or also the users who contributed to the social velocity of the secondary content. The retrieved demographics information may include age, gender, ethnicity, geographic location, occupation, education, financial status, marital status, sexual preferences, other interests, and the like, where the information may be provided by the user to the social media service and may be retrieved from the user's own profile information via the social media service APIs and the like. The demographics information may also be indexed and stored to be associated with the retrieved secondary notation data.

In some embodiments, the demographics information may be utilized by the content segmenter 201 to determine the intervals or portions of the primary content which are popular or preferred within certain demographic groups. For example, the content segmenter 201 may determine that a large number of users within the age range 18-25 have viewed, shared, liked, or re-tweeted secondary content corresponding to a scene of the primary content at minute 25 to 29. Using the same information, the content segmenter 201 may determine that within the age range 26-35, another scene at minute 87-88 of the primary content is more popular based on the social activity of users within the demographic. It will be understood that various other determinations based on retrieved demographics information may be made regarding social activity related to the primary content.

The above operations may be repeated numerous times by the external data identifier 202 to generate identifying fingerprint information for secondary content discovered and retrieved, compare identifier information with stored identifier information of primary content to determine whether there are any matches, then incrementing a counter and storing associated information regarding any matches which are determined. Based on the type of secondary content retrieved, the content segmenter and the content comparator may perform the indexing and comparing operations differently.

For example, for a video secondary content as discussed above, identifying information is generated and indexed for the video and the audio content of the video. In another example, where the secondary content corresponds to written text, such as from a blog post or a social media post, the actual text may be compared directly with the stored and indexed text of the primary content, which is based on the script, subtitle information, or closed captioning information related to the primary content.

In another example, where the secondary content corresponds to an image posted in a fan forum website, identifying information of the image, such as a macroblock vector may be generated, then the generated identifying information may be compared to macroblock vectors generated for each frame of the primary content. Since the comparator may be configured to compare vectors corresponding to 24 frames (one second), or other frame rates, when comparing secondary content corresponding to a video, identifying an image within the frames of the primary content may require a specialized approach.

Once all identified secondary content is processed and compared with the identifying information of the primary content, the counters corresponding to the various portions of the primary content may be an accurate indicator on the most popular scenes or portions of the primary content, simply based on the number of times that portion is referenced, uploaded, discussed, bookmarked, pinned, and the like. Further as discussed above, granular information regarding popularity within certain demographic groups may be determined. Based on this information, the portions of the primary content may be ranked in terms of popularity and likelihood of greater appeal on other formats, such as traditional media like television, billboards, print media, and the like.

The content segmenter may utilize the ranking information to identify the portions of content which are to be generated into short form segments for distribution via various platforms. Accordingly, using the ranking information, the content segmenter may request from the content server the primary content data corresponding to the highest ranked portions, and may generate short form video files based on the ranked portions. In some embodiments, the content segmenter may be configured to identify, request, generate, and finally upload the generated short form data to a website or database for further distribution or use. In one embodiment, the segmenter may be configured to simply upload the generated short form file to an online database or service, such as YOUTUBE.

In certain embodiments, the demographic information may further be used to identify the most effective distribution channels for the generated short form content. For example, where a particular segment of short form content is generated that has been identified to be most popular with users in the age range 18-25, the content segmenter 201 may assign that segment to be uploaded to media sharing services such as INSTAGRAM or SNAPCHAT which enjoy heavy user traffic within that demographic.

In this example, the content segmenter 201 is described as uploading and determining the distribution channels of short form content, but other embodiments are considered where the system 200 may include another hardware or software unit connected to the network 203 such as a content uploader (not depicted) which obtains generated segments of short form content from the content segmenter 201, receives associated metadata, social velocity, and demographics information, and identifies and provides the generated content to specific distribution channels, such as external websites, services, databases, and the like, via the network 203 or other communication systems as previously discussed.

Accordingly, the system may allow for identification of popular or high profile portions of the primary content, determined based on the number of times the particular portions are discussed, quoted, reproduced in video or audio formats, included as a frame of a shot, and the like. Further in some embodiments, the system may automatically select and upload portions of the primary content which are determined to have the highest ranking. In some examples, the system may retrieve high quality files of the primary content to identify, select, and generate the new identified portions of the primary content.

Figure 3:
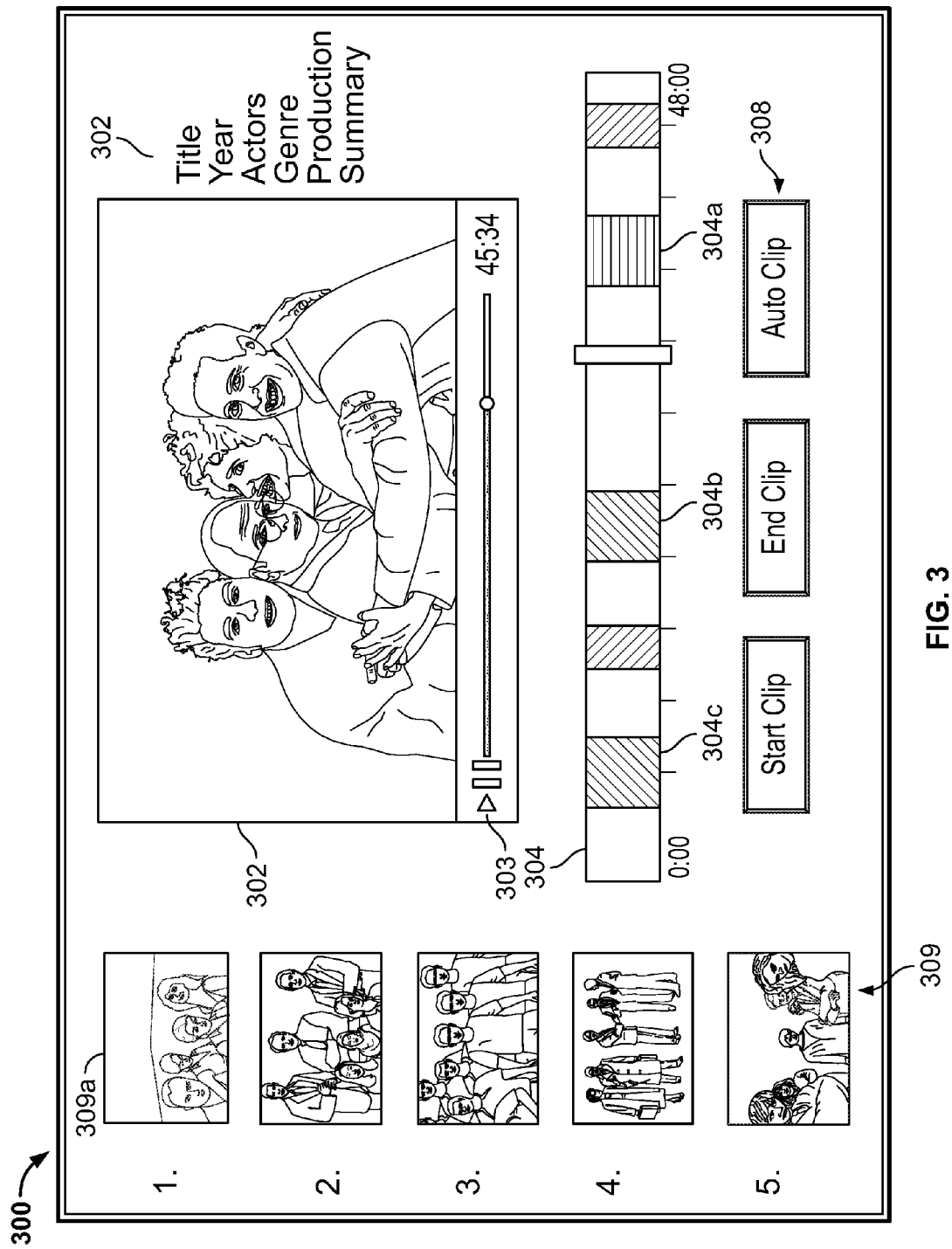
FIG. 3 is an illustration of an embodiment of an interface for generating segmented content based on related ranking information.

In some embodiments, the system may be configured to output information based on the rankings information obtained by matching the obtained secondary content. Referring to FIG. 3, shown is an example of an interface tool used by the system to output the ranking information. The content segmenter may include one or more outputs to output information regarding the ranking information. The one or more outputs may include a display or other visual output device, an audio speaker or other audible output device, and the like. The interface 300 shown in FIG. 3 may be output to a hardware display included in the one or more outputs.

The interface 300 may include display of the primary content 301 and information related to the primary content 302. Like many traditional content playback interfaces, the interface 300 may include a playback indicator progress bar and controls 303. The interface 300 may further include a heat map 304 indicating the portions of the primary content that are ranked the highest in popularity and frequency of matches with external secondary content via the operations discussed above. The heat map 304 may output information on the portions of the primary content, for example portions having a high frequency of matches 306 may be shown on the heat map 304 with a different color or pattern than the portions with no or little number of matches 307.

For example, a portion of the primary content associated with a high level of determined "social velocity" may be displayed in a white-hot color, while other portions of the primary content 304b, 304c may be displayed in a warm orange color to indicate that they are socially relevant, however having lower social velocity than portion 304a. Various portions of the heat map 304 may be selectable by the user to automatically clip the portion of the primary content and generate short-form segmented content.

Embodiments of the interface 300 may further include a visual thumbnail index 309 of the portions of the primary content in order of highest rank to lowest rank such that a click or input to the thumbnail index of each portion references the frames in the video playback progress bar. For example, clicking on 309a may result in the video playback progress bar highlighting a portion of the content corresponding to the clicked thumbnail 309a such that the user is able to view where the portion is positioned on the video timeline.

Further, the interface 300 may also include content segmenting interface tools 308 which provide for inputs to generate segmented content. The interface tools 308 may include a start input tool to mark a time point within the primary content to begin generating a content segment, as well as an end tool to mark the end of the generated segmented content. The interface tools 308 may also include an input tool to request the system to automatically identify and generate the portions of the primary content having the most number of matches. The content segmenter may further utilize systems and methods known to those of ordinary skill in the art to identify a starting point and ending point for each generated segment of the primary content, wherein the audio and/or video content is considered in determining the start and end points. For example, the segmenter may analyze and consider audio dialogue or video cuts and continuous scenes to identify the logical start and end points of a popular scene within the movie.

The interface 300 may allow a user to manually or automatically generate segmented short-form content from the long-form primary content based on the related ranking information. Inputs to the interface 300, for example utilizing the clipping tools 308, the ranked index 309, or the heat map 304 may cause the interface to generate a short-form segmented content based on the selection, either automatically based on the detected secondary content and secondary notation data, or manually based on the user's input of the clipping parameters.

Figure 4:
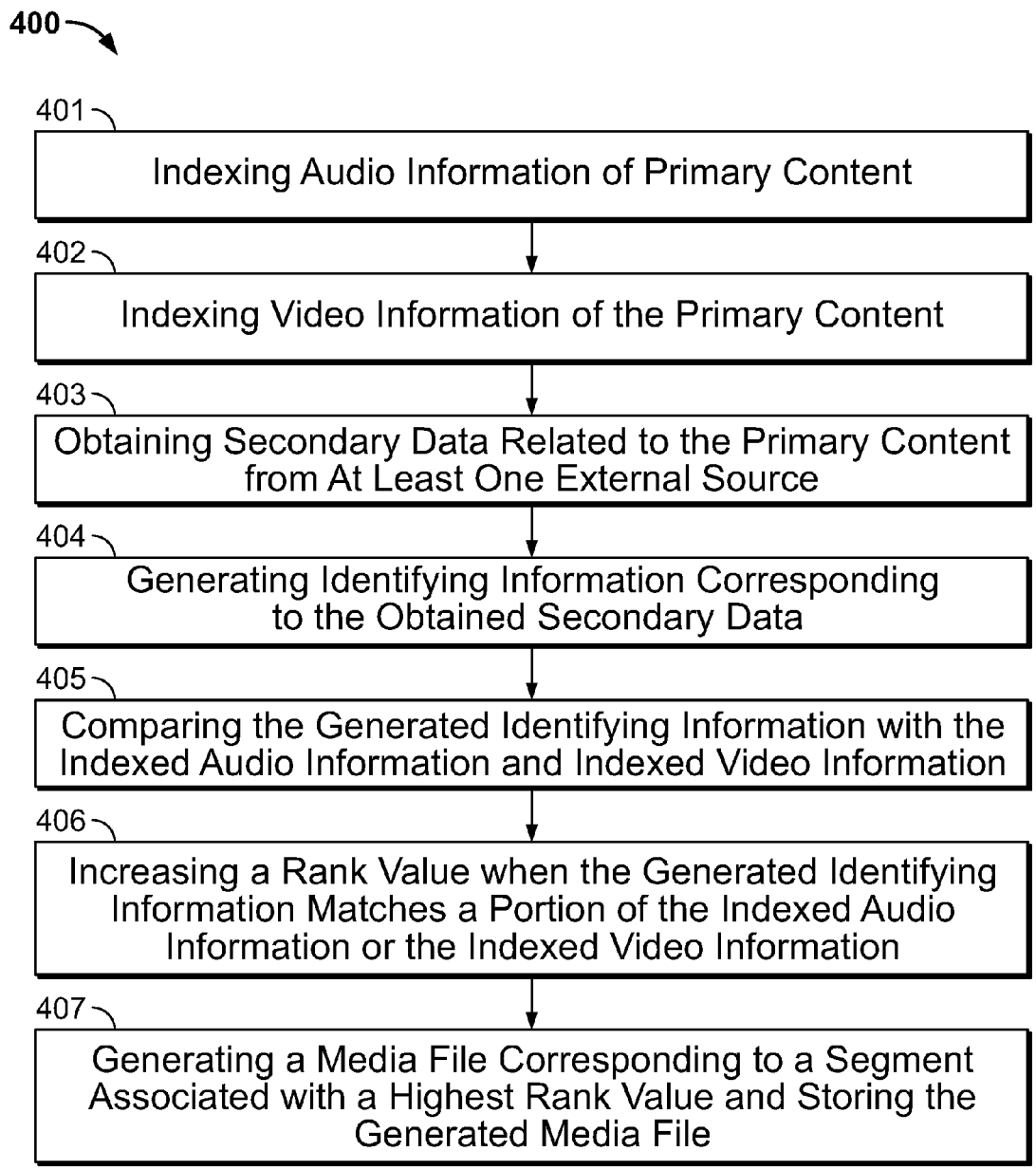
FIG. 4 is an illustration of a method of generating segmented content in accordance with an embodiment of the present disclosure.

Referring now to FIG. 4, a method 400 of generating segmented content based on related data ranking information is depicted. The method 400 may include indexing audio information of primary content based on a first plurality of time segments, wherein the indexed audio information includes a plurality of audio identifiers at block 401, followed by indexing video information of the primary content based on a second plurality of time segments, wherein the indexed video information comprises a plurality of video identifiers at block 402. The method further includes obtaining secondary data related to the primary content from at least one external source at 403. As discussed, the secondary data may include UGC such as videos, audio clips, commentary, discussion posts, and the like.

The method further includes generating identifying information corresponding to the obtained secondary data at block 404, then comparing the generated identifying information with the indexed audio information and indexed video information at block 405. Based on the comparison the method also may include increasing a rank value associated with a segment of the primary content when the generated identifying information matches at least a portion of the indexed audio information or a portion of the indexed video information corresponding to the segment at block 406 and further includes generating a media file corresponding to a segment associated with a highest rank value and storing the generated media file in a memory at block 407.

Accordingly, embodiments of systems and methods of the current disclosure may provide vast improvements to existing systems and methods for generating segmented content, including short form content based on primary content, where the short form content is generated and segmented based on rankings information associated with secondary content. External data may be searched, retrieved, analyzed, and compared to generate rankings information to improve functionality of systems and methods for generating segmented short form content. Further, various systems and methods to generate identifying information associated with primary content and secondary content as discussed above may be implemented to provide improved functionality to determine relevant secondary content and identify associated portions or intervals of primary content to obtain the rankings information. Additionally, various systems and methods may be implemented to identify distribution channels, destinations, and recipients of the generated content based on secondary notation data and demographics information to improve the functionality of systems and methods for distributing short form content.

Figure 5:
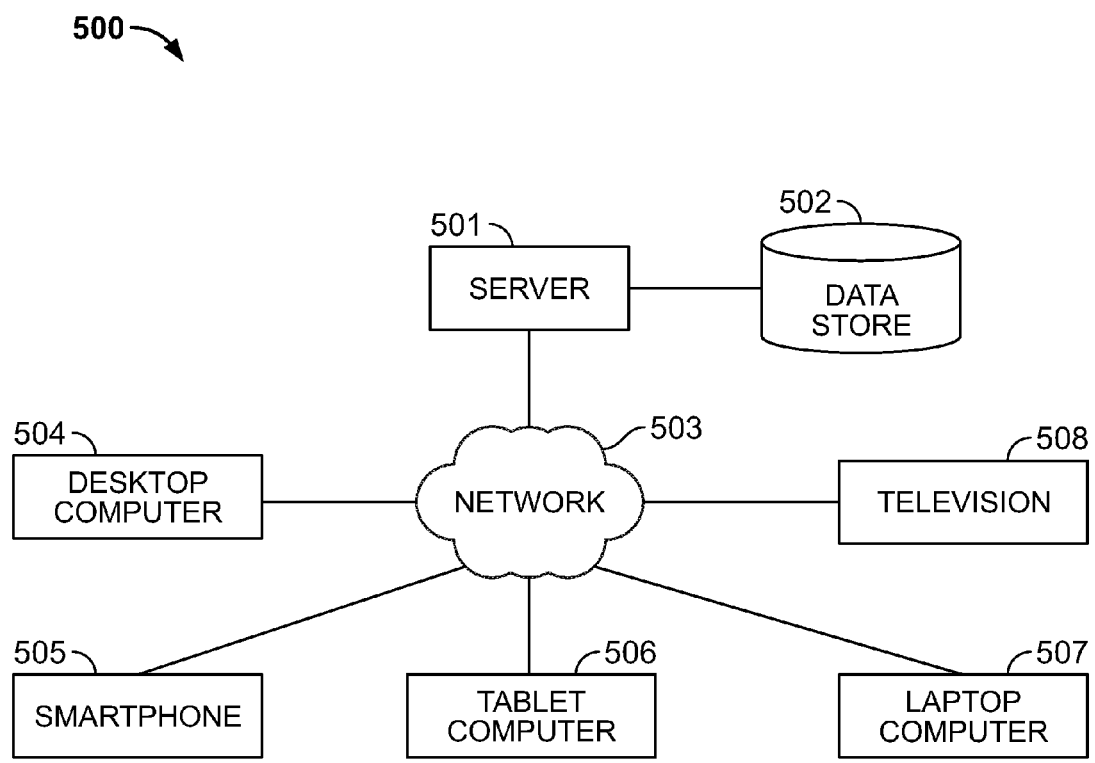
FIG. 5 is an illustration of a computing environment in accordance with an embodiment of the present disclosure.

In selected embodiments, the features and aspects disclosed herein may be implemented in computer hardware, discussed further below with respect to FIG. 6, within a computing environment 500 shown in FIG. 5, which may include one or more computer servers 501. A server 501 may be operatively coupled to one or more data stores 502 (e.g., databases, indexes, files, or other data structures). A server 501 may connect to a data communication network 503 comprising a local area network (LAN), a wide area network (WAN) (e.g., the Internet), a telephone network, a satellite or wireless communication network, or some combination of these or similar networks.

One or more client devices 504, 505, 506, 507, 508 may be in communication with the server 501, and a corresponding data store 502 via the data communication network 503. Such client devices 504, 505, 506, 507, 508 may include, for example, one or more laptop computers 507, desktop computers 504, smartphones and mobile phones 505, tablet computers 506, televisions 508, or combinations thereof. In operation, such client devices 504, 505, 506, 507, 508 may send and receive data or instructions from or to the server 501, in response to user input received from user input devices or other input. In response, the server 501 may serve data from the data store 502, alter data within the data store 502, add data to the data store 502, or the like or combinations thereof.

In selected embodiments, the server 501 may stream or transmit one or more video files including video content, audio content, encoded data, generated data, and/or metadata from the data store 502 to one or more of the client devices 504, 505, 506, 507, 508 via the data communication network 503. The devices may output video content from the video file using a display screen, projector, or other video output device. For example, the video file may comprise a clip of a movie, television show, live programming, news broadcast, or portion thereof for output using a display device of one or more of the client devices. In certain embodiments, the system 200 configured in accordance with the features and aspects disclosed herein may be configured to operate within or support a cloud computing environment. For example, a portion of, or all of, the data store 502 and server 501 may reside in a cloud server.

Figure 6:
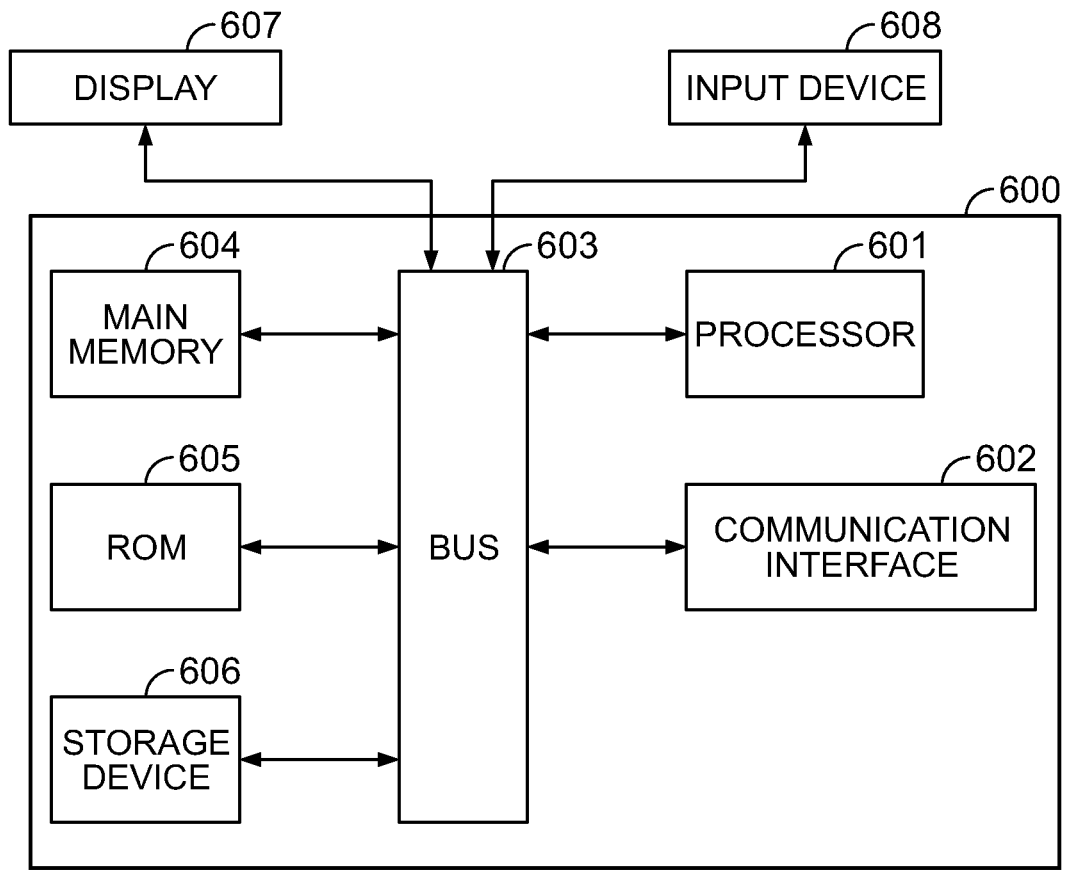
FIG. 6 is an illustration of a device in accordance with an embodiment of the present disclosure.

Referring to FIG. 6, an illustration of an example computer 600 is provided. One or more of the devices 504, 505, 506, 507, 508 of the system 500 may be configured as or include such a computer 600. In selected embodiments, the computer 600 may include a bus 603 (or multiple buses) or other communication mechanism, a processor 601, main memory 604, read only memory (ROM) 605, one or more additional storage devices 606, a communication interface 602, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 603 or other communication mechanism, including multiple such buses or mechanisms, may support communication of information within the computer 600. A processor 601 may be connected to a bus 603 and process information. In selected embodiments, a processor 601 may be a specialized or dedicated microprocessor configured to perform particular tasks in accordance with the features and aspects disclosed herein by executing machine-readable software code defining the particular tasks. Main memory 604 (e.g., random access memory—or RAM—or other dynamic storage device) may be connected to a bus 603 and store information and instructions to be executed by a processor 601. Main memory 604 may also store temporary variables or other intermediate information during execution of such instructions.

Read only memory 605 (ROM) or some other static storage device may be connected to a bus 603 and store static information and instructions for a processor 601. An additional storage device 606 (e.g., a magnetic disk, optical disk, memory card, or the like) may be connected to a bus 603. The main memory 604, ROM 605, and the additional storage device 606 may include a non-transitory computer-readable medium holding information, instructions, or some combination thereof, for example instructions that when executed by the processor 601, cause the computer 600 to perform one or more operations of a method as described herein. A communication interface 602 may also be connected to a bus 603. A communication interface 602 may provide or support two-way data communication between a computer 600 and one or more external devices (e.g., other devices contained within the computing environment).

In selected embodiments, a computer 600 may be connected (e.g., via a bus) to a display 607. A display 607 may use any suitable mechanism to communicate information to a user of a computer 600. For example, a display 607 may include or utilize a liquid crystal display (LCD), light emitting diode (LED) display, projector, or other display device to present information to a user of the computer 600 in a visual display. One or more input devices 608 (e.g., an alphanumeric keyboard, mouse, microphone) may be connected to a bus 603 to communicate information and commands to a computer 600. In selected embodiments, one input device 608 may provide or support control over the positioning of a cursor to allow for selection and execution of various objects, files, programs, and the like provided by the computer 600 and displayed by a display 607.

The computer 600 may be used to transmit, receive, decode, display, or the like one or more video files. In selected embodiments, such transmitting, receiving, decoding, and displaying may be in response to a processor 601 executing one or more sequences of one or more instructions contained in main memory 604. Such instructions may be read into main memory 604 from another non-transitory computer-readable medium (e.g., a storage device).

Execution of sequences of instructions contained in main memory 604 may cause a processor 601 to perform one or more of the procedures or steps described herein. In selected embodiments, one or more processors in a multi-processing arrangement may also be employed to execute sequences of instructions contained in main memory 604. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by a processor 601, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 602 may provide or support external, two-way data communication to or via a network link. For example, a communication interface 602 may be a wireless network interface controller or a cellular radio providing a data communication network connection. Alternatively, a communication interface 602 may comprise a local area network (LAN) card providing a data communication connection to a compatible LAN. In any such embodiment, a communication interface 602 may send and receive electrical, electromagnetic, or optical signals conveying information.

A network link may provide data communication through one or more networks to other data devices (e.g., client devices as shown in the computing environment 500). For example, a network link may provide a connection through a local network of a host computer or to data equipment operated by an Internet Service Provider (ISP). An ISP may, in turn, provide data communication services through the Internet. Accordingly, a computer 600 may send and receive commands, data, or combinations thereof, including program code, through one or more networks, a network link, and communication interface 602. Thus, a computer 600 may interface or otherwise communicate with a remote server (e.g., server 501), or some combination thereof.

The various devices, modules, terminals, and the like discussed herein may be implemented on a computer by execution of software comprising machine instructions read from computer-readable medium, as discussed above. In certain embodiments, several hardware aspects may be implemented using a single computer, in other embodiments multiple computers, input/output systems and hardware may be used to implement the system.

For a software implementation, certain embodiments described herein may be implemented with separate software modules, such as procedures and functions, each of which perform one or more of the functions and operations described herein. The software codes can be implemented with a software application written in any suitable programming language and may be stored in memory and executed by a controller or processor.

The foregoing disclosed embodiments and features are merely exemplary and are not to be construed as limiting the present invention. The present teachings can be readily applied to other types of apparatuses and processes. The description of such embodiments is intended to be illustrative, and not to limit the scope of the claims. Many alternatives, modifications, and variations will be apparent to those skilled in the art.

What is claimed is:

1. A method comprising:
    indexing audio information of primary content based on a first plurality of time segments, wherein the indexed audio information comprises a plurality of audio identifiers;
    indexing video information of the primary content based on a second plurality of time segments, wherein the indexed video information comprises a plurality of video identifiers;
    obtaining secondary data related to the primary content from at least one external source, wherein the secondary data corresponds to data related to external social media information sources and comprises social activity information and demographic information of one or more persons associated with the social media activity information;
    generating identifying information corresponding to the obtained secondary data and comparing the generated identifying information with the indexed audio information and indexed video information;
    increasing a rank value associated with a segment of the primary content when the generated identifying information matches at least a portion of the indexed audio information or a portion of the indexed video information corresponding to the segment;
    displaying a content map comprising a playback timeline corresponding to the duration of the primary content, wherein the content map comprises one or more graphic indicators indicating one or more portions of the content map that correspond to segments of the primary content according to a rank value associated with each segment of the primary content;
    generating a media file corresponding to a highest ranked portion of the one or more portions of the primary content; and
    outputting the generated media file to a media service, wherein the media service is selected based on the demographic information.

2. The method of claim 1, further comprising obtaining metadata related to the primary content and associating the obtained metadata with the primary content.

3. The method of claim 1 wherein the secondary data is obtained based on a search for the obtained metadata in the at least one external source.

4. The method of claim 1, wherein the secondary data comprises secondary video data, secondary audio data, secondary text data, or secondary image data corresponding to content included in the primary content.

5. The method of claim 1, further comprising generating a media file corresponding to a segment of the primary content associated with a highest rank value and storing the generated media file in a memory, wherein the generated media file is stored to be associated with at least the primary content and the social activity information.

6. The method of claim 1, wherein the rank value is increased according to an amount of the social activity information associated with the secondary data.

7. A system for generating segmented content, the system comprising:
    a display configured to display information;
    a communication unit configured to transmit and receive information; and
    one or more processors configured to:
        index audio information of primary content based on a first plurality of time segments, wherein the indexed audio information comprises a plurality of audio identifiers;
        index video information of the primary content based on a second plurality of time segments, wherein the indexed video information comprises a plurality of video identifiers;
        obtain secondary data related to the primary content from at least one external source via the communication unit, wherein the secondary data corresponds to data related to external social media information sources and comprises social activity information and demographic information of one or more persons associated with the social media activity information;
        generate identifying information corresponding to the obtained secondary data and comparing the generated identifying information with the indexed audio information and indexed video information;
        increase a rank value associated with a segment of the primary content when the generated identifying information matches at least a portion of the indexed audio information or a portion of the indexed video information corresponding to the segment;
        cause the display to display a content map comprising a playback timeline corresponding to the duration of the primary content, wherein the content map comprises one or more graphic indicators indicating one or more portions of the content map that correspond to segments of the primary content according to a rank value associated with each segment of the primary content;
        generate a media file corresponding to a highest ranked portion of the one or more portions of the primary content; and output the generated media file to a media service, wherein the media service is selected based on the demographic information.

8. The system of claim 7, wherein the one or more controllers are further configured to:
obtain metadata related to the primary content; and
associate the obtained metadata with the primary content.

9. The system of claim 7, wherein the secondary data is obtained based on a search for the obtained metadata in the at least one external source.

10. The system of claim 7, wherein the secondary data comprises secondary video data, secondary audio data, secondary text data, or secondary image data corresponding to content included in the primary content.

11. The system of claim 7, further comprising a memory configured to store information, wherein the one or more processors are configured to generate a media file corresponding to a segment of the primary content associated with a highest rank value and cause the memory to store the generated media file, wherein the generated media file is stored to be associated with at least the primary content and the social activity information.

12. The system of claim 7, wherein the rank value is increased according to an amount of the social activity information associated with the secondary data.

13. A method comprising:
displaying on a display primary content with metadata information related to the primary content;
displaying on the display a content map comprising a playback timeline corresponding to the duration of the displayed primary content, wherein the content map comprises one or more graphic indicators indicating one or more portions of the content map that correspond to segments of the primary content according to a rank value associated with each segment of the primary content, wherein the rank value corresponds to user activity level associated with each corresponding segment by users of an external service;
generating a media file corresponding to a highest ranked portion of the one or more portions of the primary content in response to receiving an input to an interface associated with the displayed content map; and
storing the generated media file in a memory to be associated with the metadata information and transmitting the generated media file to a media service via a communication unit,
wherein the selected media service is selected from a plurality of media services for transmitting the generated media file based on demographic information associated with one or more users corresponding to the user activity level, such that the demographic information associated with the one or more users is most similar to demographic information associated with the selected media service among the plurality of media services.

14. The method of claim 13, wherein information of the user activity level is obtained based on a search for the metadata in the external service.

\* \* \* \* \*